United States Patent
Fine

(10) Patent No.: US 12,464,347 B2
(45) Date of Patent: Nov. 4, 2025

(54) METHOD FOR ESTABLISHING A BIDIRECTIONAL NAS SIGNALIZATION CHANNEL BETWEEN A SECURE ELEMENT COOPERATING WITH A TERMINAL AND A DISTANT PLATFORM

(71) Applicant: THALES DIS FRANCE SAS, Meudon (FR)

(72) Inventor: Jean-Yves Fine, Gémenos (FR)

(73) Assignee: THALES DIS FRANCE SAS, Meudon (FR)

( * ) Notice: Subject to any disclaimer, the term of this patent is extended or adjusted under 35 U.S.C. 154(b) by 519 days.

(21) Appl. No.: 17/312,623

(22) PCT Filed: Dec. 10, 2019

(86) PCT No.: PCT/EP2019/084506
§ 371 (c)(1),
(2) Date: Jun. 10, 2021

(87) PCT Pub. No.: WO2020/126702
PCT Pub. Date: Jun. 25, 2020

(65) Prior Publication Data
US 2022/0022037 A1    Jan. 20, 2022

(30) Foreign Application Priority Data
Dec. 18, 2018  (EP) ..................... 18306726

(51) Int. Cl.
*H04L 29/06* (2006.01)
*H04W 8/18* (2009.01)
(Continued)

(52) U.S. Cl.
CPC .......... *H04W 12/06* (2013.01); *H04W 8/183* (2013.01); *H04W 8/20* (2013.01); *H04W 12/037* (2021.01); *H04W 12/35* (2021.01); *H04W 12/40* (2021.01)

(58) Field of Classification Search
CPC ... H04W 12/037; H04W 12/06; H04W 12/35; H04W 12/40; H04W 8/183; H04W 8/20
See application file for complete search history.

(56) References Cited

U.S. PATENT DOCUMENTS

| 7,792,530 | B2 | 9/2010 | Tariq et al. |
| 2011/0029618 | A1 | 2/2011 | Lavy et al. |

(Continued)

FOREIGN PATENT DOCUMENTS

| EP | 3024254 A1 | 5/2016 |
| JP | 2012518350 A | 9/2012 |

(Continued)

OTHER PUBLICATIONS

International Search Report (PCT/ISA/210) and Written Opinion (PCT/ISA/237) mailed on Jan. 16, 2020, by the European Patent Office as the International Searching Authority for International Application No. PCT/EP2019/084506.

(Continued)

*Primary Examiner* — Jeffrey C Pwu
*Assistant Examiner* — Thong P Truong

(57) ABSTRACT

The invention proposes a method for establishing a bidirectional NAS signalization channel between a secure element cooperating with a terminal and a distant platform through a Network Exposure Function, upon request of either the secure element or the distant platform. The method includes an exchange of containers of data between the distant platform and the secure element through the Network Exposure Function.

5 Claims, 3 Drawing Sheets

Figure 1:
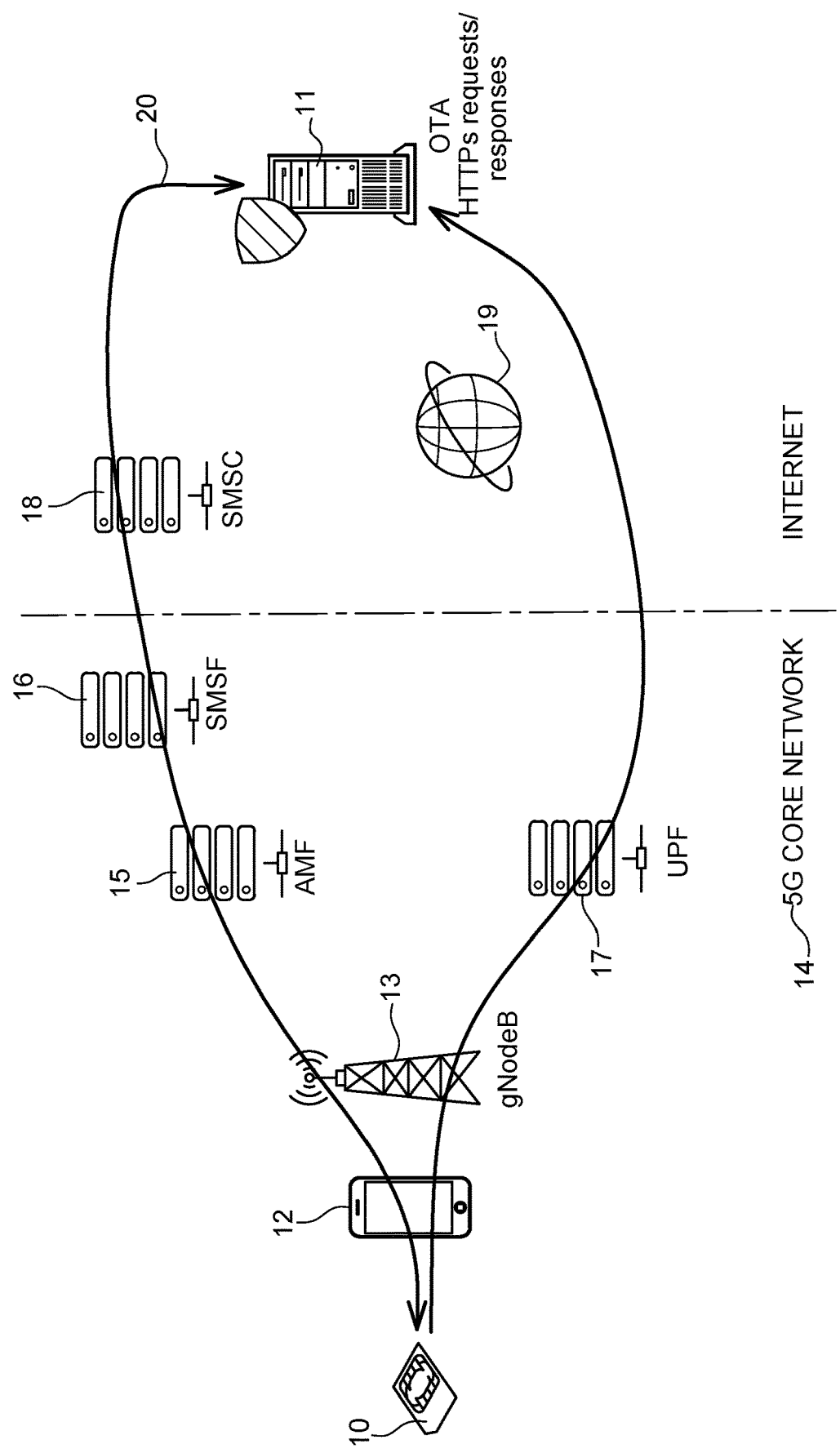

(51) Int. Cl.
*H04W 8/20* (2009.01)
*H04W 12/037* (2021.01)
*H04W 12/06* (2021.01)
*H04W 12/30* (2021.01)
*H04W 12/40* (2021.01)

(56) References Cited

U.S. PATENT DOCUMENTS

| | | | | |
|---|---|---|---|---|
| 2013/0203465 A1* | 8/2013 | Ali | H04L 65/1073 | 455/558 |
| 2014/0143108 A1* | 5/2014 | Smith | G06Q 20/321 | 705/35 |
| 2020/0146077 A1* | 5/2020 | Li | H04W 76/10 | |

FOREIGN PATENT DOCUMENTS

| WO | 2018035431 A1 | 2/2018 |
|---|---|---|
| WO | 2018206095 A1 | 11/2018 |

OTHER PUBLICATIONS

"3rd Generation Partnership Project; Technical Specification Group Core Network and Terminals; Universal Subscriber Identity Module (USIM) Application Toolkit (USAT) (Release 9)", 3GPP Standard TS 31.111, vol. CT WG6, No. V9.12.2, Oct. 18, 2018 (Oct. 18, 2018), pp. 1-111.

"Smart Cards; Card Application Toolkit (CAT) (Release 14)", vol. TS 102 223, No. V14.0.0, May 22, 2017 (May 22, 2017), pp. 1-247, ETSI TECS Institute (ETSI) retrieved from the internet: http://www.etsi.org/deliver/etsi_ts/102200_102299/102223/14.00.00_60/ts_1022223v140000p.pdf.

Behrad, Shanay, et al., "Securing authentication for mobile networks, a survey on 4G issues and 5G answers", 2018 21st Conference on Innovation in Clouds, Internet and Networks and Workshops (ICIN), IEEE, Feb. 19, 2018 (Feb. 19, 2018), pp. 1-8.

Ericsson, "TS 23.501: NEF Functionality", vol. SA WG2, No. Reno, Nevada, USA; Nov. 27, 2017-Dec. 1, 2017, Dec. 4, 2017 (Dec. 4, 2017), 3GPP Draft; S2-179495_WAS116_WAS8806 WAS 177526-NEF-FUNCTIONS_PA8, retrieved from the internet: http://www.3gpp.org/ftp/tsg%Fsa.WG2%5FArch/TSGS2%F124%5FReno/Docs/.

Examination Report from JP Patent Office for co-pending patent Application N°2021-535143 and English translation (5 pages).

* cited by examiner

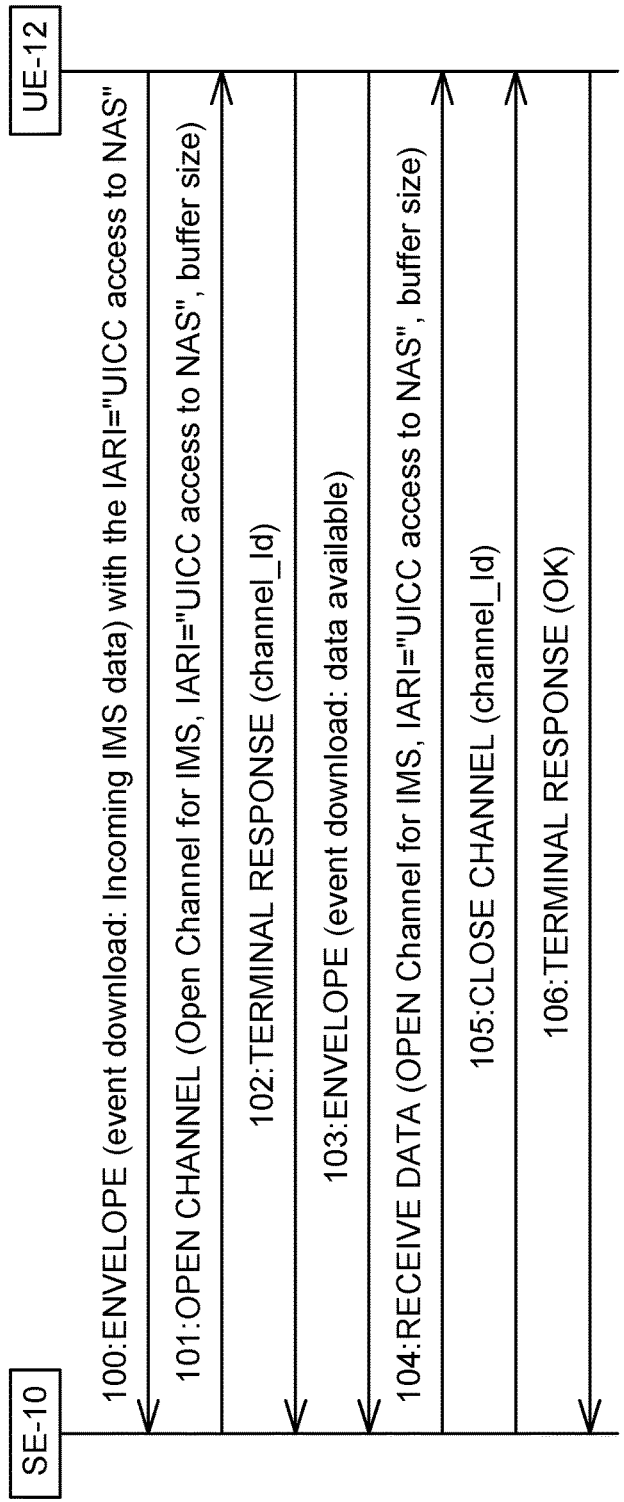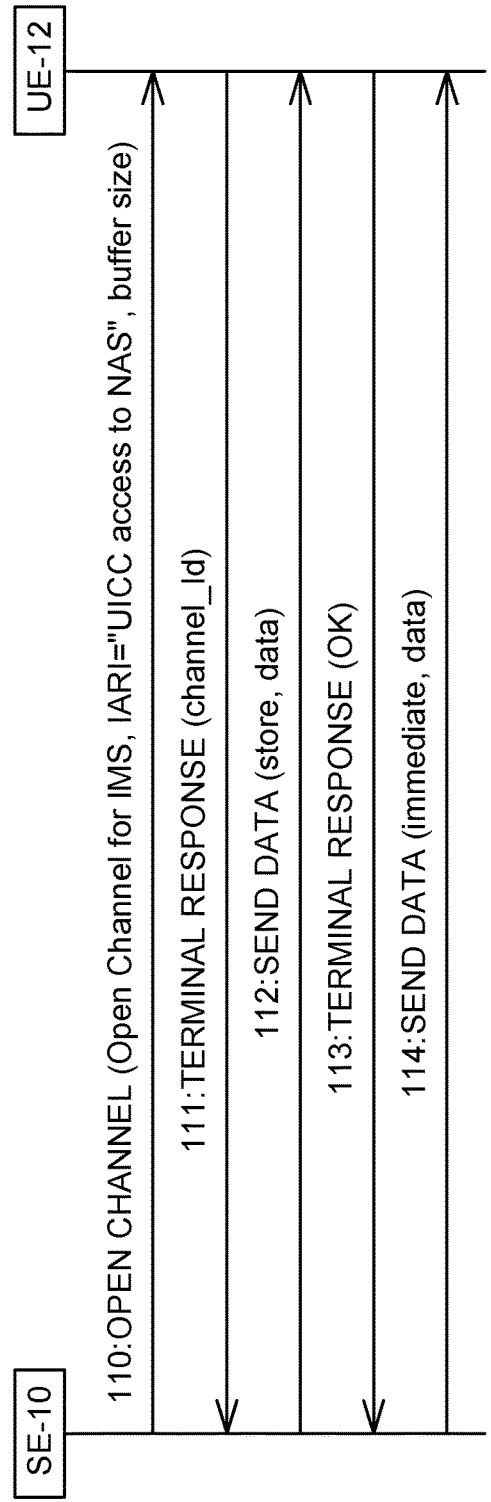

METHOD FOR ESTABLISHING A BIDIRECTIONAL NAS SIGNALIZATION CHANNEL BETWEEN A SECURE ELEMENT COOPERATING WITH A TERMINAL AND A DISTANT PLATFORM

The present invention relates to the field of telecommunications and more specifically that of the establishment of a bidirectional channel between a secure element cooperating with a terminal and a distant platform.

The secure element is for example a UICC (Universal Integrated Circuit Card) a iUICC (integrated UICC) or a eUICC (embedded UICC). The terminal is typically a portable terminal such as a mobile phone, a smartphone or a PDA (Personal Digital Assistant).

The secure element is not necessarily physically connected to the terminal, but can communicate with the latter through a short range connection, wherein the security element is offset and communicates with the terminal via a short range channel (Bluetooth or Wi-Fi for instance).

The establishment of a bidirectional channel between the secure element and the distant platform is for example necessary for administrating this secure element over the air (when the platform is an OTA platform) or download a full subscription in the secure element (in this case, the platform is a RPS platform as defined by the GSMA).

Secure elements can be administered in two ways: The first one consists in transmitting, from an OTA platform, data or programs to targeted secure elements, for example in the course of updating campaigns. This type of administration is called "push" and is based on the transmission in SMS mode. The problem lies in that this method is not suitable for new generation networks such as LTE networks which do not support the SMS (they are fully http).

The second one consists in interrogating, for example regularly or upon the occurrence of an event, the OTA platform in order to know whether updates are available or not. Such interrogation is initiated by the secure element and is called "polling" or "pull" (the secure element checks out whether the platform has something to transmit to it). The interrogation is carried out in http mode. FIG. 1 represents two over the air channels that are today available for data exchange between a secure element and a remote server: SMS and HTTP/S.

In this figure are represented:
A secure element 10,
A distant platform 11 (here an OTA platform),
A terminal 12 (User Equipment or UE) with which the secure element 10 cooperates.

In any case, the terminal 12 communicates with the server 11 through a base station 13 (gNodeB of a 5G network 14).

The 5G core network 14 comprises:
An AMF (Access and Mobility Management Function) 15 which function is to handle the mobility of the UE 12. Its primary tasks include: Registration Management, Connection Management, Reachability Management, Mobility Management and various function relating to security and access management and authorization;
A SMSF (SMS Function) 16 which function is to handle the SMS sent by the UE 12 or to be sent to the UE 12;
A UPF (User Plane Function) 17 which role is similar to the one played by the Serving/Packet Gateway in a 4G LTE system. The UPF supports features and capabilities to facilitate user plane operation. Examples include: packet routing and forwarding, interconnection to the Data Network, policy enforcement and data buffering.

The 5G core network 14 communicates via Internet with the OTA platform 11. On this side we have an Internet SMSC 18.

The first air channel today available for data exchange between the secure element 10 and the server 11 is referenced 20. It is a bidirectional SMS channel (push mode) that involves the AMF 15, the SMSF 16 and the SMSC 18. SMS is bidirectional but has a very low bandwidth.

The second today available air channel is referenced 21. It is a http/s channel that involves Internet and (on the 5G core network 14 side) the UPF 17. A http/s channel has a good bandwidth but is client server unidirectional: It is always the UE 12 that shall open the channel, driving the need to have push SMS or non-optimized polling mechanisms.

The proposed method provides a third bidirectional communication channel with sufficient bandwidth between the secure element 10 and the remote server 11. This channel can be used upon request of either the secure element 10 or the distant platform 11, for example for downloading a preferred PLMN list for roaming purposes (SoR—Steering of Roaming). In particular, this channel can be used for all remote secure element's administration use cases.

In this respect, the invention proposes a method for establishing a bidirectional NAS (Non-Access Stratum) signalization channel between a secure element cooperating with a terminal and a distant platform through a NEF (Network Exposure Function), upon request of either the secure element or the distant platform, the method comprising an exchange of containers of data between the distant platform and the secure element through the NEF.

In a first embodiment, the distant platform is an OTA platform.

In a second embodiment, the distant platform is a RSP platform as defined by the GSMA.

Preferably, the containers are exchanged over BIP between the secure element and the terminal.

In another embodiment, the containers are exchanged between the secure element and the terminal through a file written in the secure element.

Figure 2:
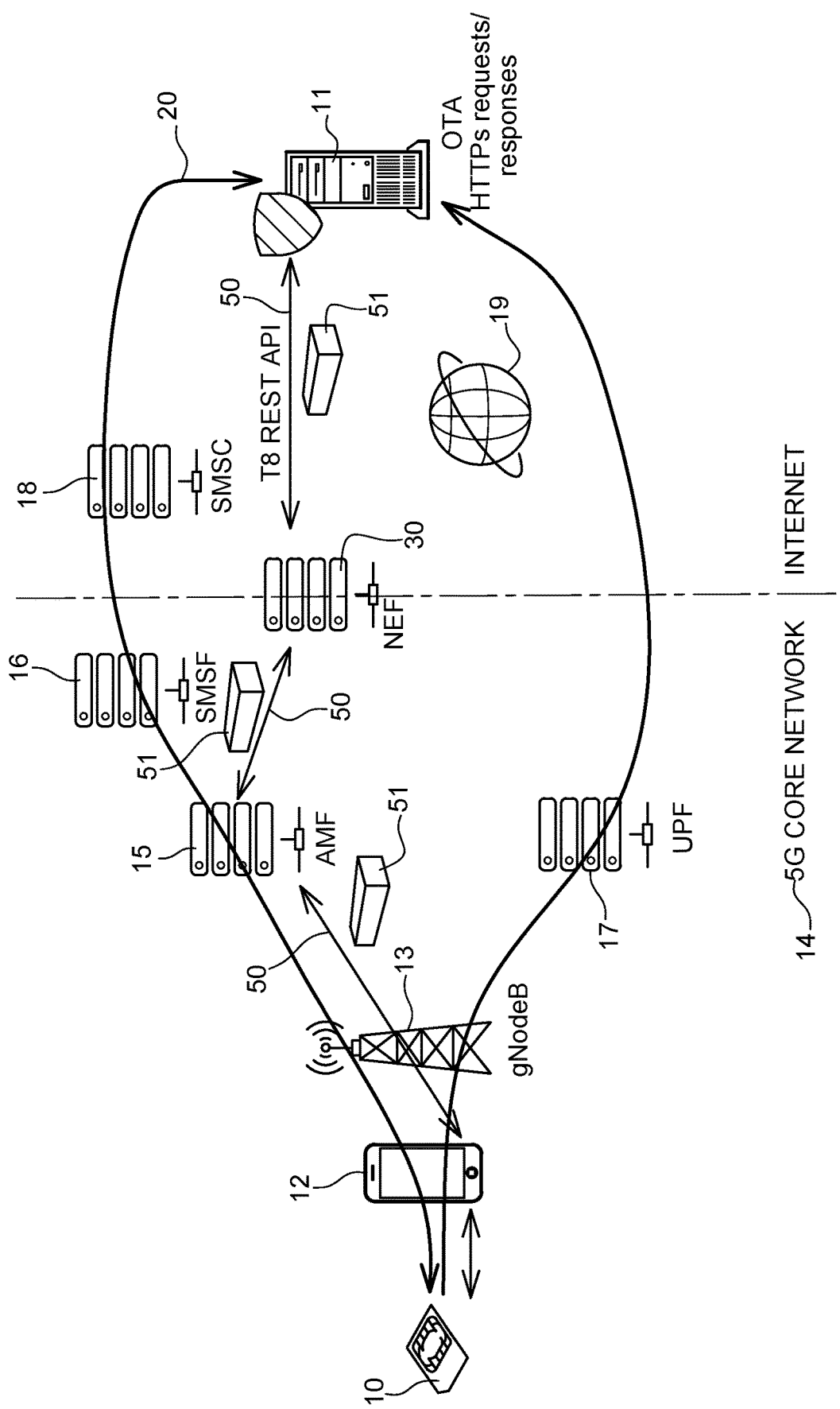

The present invention will be better understood by reading the following description of the figures that represent:

FIG. 1, two over the air channels that are today available for data exchange between a secure element and a remote server;

FIG. 2, a third bidirectional communication channel between the secure element and the remote server, according to the invention;

FIGS. 3 and 4 two different ways for exchanging data between the secure element and the user's terminal.

FIG. 1 has already been described in regard of the state of the art.

FIG. 2 represents a third bidirectional communication channel between the secure element and the remote server, according to the invention.

In this figure, a bidirectional communication channel 50 is established between the secure element 10 and a remote server 11 through 5G network signaling.

T8 is an interface/Reference point for exposing framework services as RESTful APIs for M2M applications between a NEF 30 (Network Exposure Function) and the server 11.

The signalization channel 50 is a NAS (Non-Access Stratum) channel that can be used upon request of either the secure element 10 or the distant platform 11.

NAS is a functional layer in the UMTS and LTE wireless telecom protocol stacks between the core network and user equipment.[1] This layer is used to manage the establishment of communication sessions and for maintaining continuous communications with the user equipment as it moves. The NAS is defined in contrast to the Access Stratum which is responsible for carrying information over the wireless portion of the network. A further description of NAS is that it is a protocol for messages passed between the User Equipment, also known as mobiles, and Core Nodes (e.g. Mobile Switching Center, Serving GPRS Support Node, or Mobility Management Entity) that is passed transparently through the radio network. Examples of NAS messages include Update or Attach messages, Authentication Messages, Service Requests and so forth. Once the User Equipment (UE) establishes a radio connection, the UE uses the radio connection to communicate with the core nodes to coordinate service. The distinction is that the Access Stratum is for dialogue explicitly between the mobile equipment and the radio network and the NAS is for dialogue between the mobile equipment and core network nodes. For LTE, the Technical Standard for NAS is 3GPP TS 24.301.

On this channel, containers 51 are exchanged between the distant platform 11 and the secure element 10 through the NEF 30 that constitutes an interface between the 5G Network 14 and the Internet 19. This means that the containers 51 can be sent by the remote server 11 or by the secure element 10.

These containers are specific for exchanges between the secure element 10 and the server 11. The invention consists in a generic "UICC container" that should be attached to any Downlink and Uplink signaling message, together with a local way to exchange the UICC container between SIM and UE. On the core network side, the Invention leverages also on the remote server/UDM connection.

Preferably, the downlink containers (sent from the remote server 11 to the secure element 10) comprise a list of PLMN that should be used by the secure element 10. This permits to have a control, by the remote server 11 on the behavior of the secure element 10 while roaming. But the containers can contain any type of messages, instructions, applets, . . . to be sent to the secure element 10. For the uplink (messages sent by the secure element 10 to the server 11), the same remark applies.

The different packets can be identified by an IARI (IMS Application Reference Identifier) defined by default that correspond to a message that is not an IMS message, between the UE 12 and the secure element 10. This IARI is only used between the secure element 10 and the UE 12.

In a first embodiment, the distant platform is an OTA platform.

In a second embodiment, the distant platform is a RSP platform as defined by the GSMA.

At the level of the exchanges between the secure element 10 and the UE 12, the containers can be exchanged over BIP.

This exchange of data is represented in FIG. 3.

At step 100, an ENVELOPE (event download: Incoming IMS data) with the IARI="UICC access to NAS" message is sent from the UE 12 to the SE 10.

The SE 10 replies with a message at step 101 with a "OPEN CHANNEL (Open Channel for IMS, IARI="UICC access to NAS", buffer size)" message.

The UE 12 then replies with a "TERMINAL RESPONSE (channel_Id)» at step 102.

The UE 12 replies to this response with a "ENVELOPE (event download: data available)" at step 103.

Then, at step 104, the SE 10 sends a "RECEIVE DATA (Open Channel for IMS, IARI="UICC access to NAS", buffer size)" message to the UE 12.

The protocol ends with steps 105 and 106 where the SE 10 sends a "CLOSE CHANNEL (channel_Id)» request to the UE 12 and the UE 12 responds with a ««TERMINAL RESPONSE (OK)" message.

In another embodiment, the containers are exchanged between the secure element and the terminal through a file written in the secure element.

This is represented in FIG. 4.

In a first step 110, the SE 10 sends an "OPEN CHANNEL (Open Channel for IMS, IARI="UICC access to NAS", buffer size)" to the terminal UE 12. This one answers at step 111 with a "TERMINAL RESPONSE (channel_Id)" message. Then, at step 112, the SE 10 sends an invitation message "SEND DATA (store, data)" to the UE 12.

The UE 12 answers with a "TERMINAL RESPONSE (OK)» at step 113 and the process finishes with a message from the SE 10 to the UE 12 «SEND DATA (immediate, data)".

The invention has a particular interest for ODC (On Demand Connectivity, where an end-user can choose his MNO with an embedded secure element (eUICC or iUICC)) and for OTA platforms that administrate these embedded secure elements.

So, as afore mentioned, a Steering of Roaming (SoR) can be introduced, where a "SOR transparent container" is attached to two downlink 5G signaling NAS (Non Access Stratum) message: REGISTRATION ACCEPT and DL NAS. When receiving such container, the UE shall transfer it to secure element using SMS PP data Download envelope. Referenced are: 3GPP TS 24.501 CR C1-184908/TS 23.122 C1-184911/TS 31.111 C6-180417.

In the core network side, the remote server has a connection with the 5G Unified Data Management (UDM, which is HSS evolution) to provide the SoR transparent container content.

It has also to be mentioned that ETSI TS 131.111 V13.4.0 (2016-08) release 13 entitled "Digital cellular telecommunications system (Phase 2+) (GSM); Universal Mobile telecommunications System (UMTS); LTE; Universal Subscriber Identity Module (USIM), Application Toolkit (USAT)" describes in his annex R how a UICC can access to an IMS network. The invention simply proposes to modify this annex R in order to transfer data between the UE and the secure element.

It consists in replacing incoming or outgoing IMS signaling messages by any DL NAS or UL NAS message on annex R flowcharts.

To make such replacement, we can for example define a specific IARI—i.e: "UICC access to NAS"—for both UE and SIM to know that incoming and outgoing messages are not to be carried over SIP for IMS network but over 5G NAS.

Through dedicated Terminal Profile value, the UE indicates to SIM that it supports the UICC container Over NAS feature.

The invention claimed is:

1. Method for establishing a bidirectional NAS (Non-Access Stratum) signalization channel between a secure element cooperating with a terminal and a distant platform through a Network Exposure Function, upon request of either said secure element or said distant platform, said method comprising:

exchanging by a computer containers of data between said distant platform and said secure element through said Network Exposure Function, wherein the exchange comprises the reception of an envelope, and opening by the secure element a local bearer independent protocol (BIP) session between device and said secure element with a dedicated end point defined through an IARI mechanism based on the envelope, wherein opening the local BIP session comprises, sending an envelope with an IARI="UICC access to NAS" message from the user equipment to the secure element;

replying by the secure element, with a message with a "OPEN CHANNEL (Open Channel for IMS, IARI="UICC access to NAS", buffer size)" message;

replying by the user equipment, with a "TERMINAL RESPONSE (channel Id)";

replying, by the user equipment, with a "ENVELOPE (event download: data available)";

sending, by the secure element, a "RECEIVE DATA (Open Channel for IMS, IARI="UICC access to NAS", buffer size)" message to the user equipment;

sending, by the secure element, a "CLOSE CHANNEL (channel Id)»request to the user equipment; and responding, by the user equipment, with a "TERMINAL RESPONSE (OK)" message.

2. Method according to claim 1 wherein said distant platform is an Over the Air (OTA) platform.

3. Method according to claim 1 wherein said distant platform is a Remote SIM Provisioning (RSP) platform as defined by Global System for Mobile Communications (GSMA).

4. Method according to claim 1 wherein said containers are exchanged over Bearer Independent Protocol (BIP) (Bearer Independent Protocol) between said secure element and said terminal.

5. Method according to claim 1 wherein said containers are exchanged between said secure element and said terminal through a file written in said secure element.

* * * * *